Patented May 5, 1936

2,039,543

UNITED STATES PATENT OFFICE 2,039,543

PROCESS FOR THE MANUFACTURE OF ACETONE

Hermanus Frans Joseph Lorang, Amsterdam, Netherlands, assignor to Shell Development Company, San Francisco, Calif., a corporation of Delaware No Drawing. Application October 8, 1930, Serial No. 487,378. In Great Britain October 10, 1929

7 Claims. (Cl. 260—134)

My invention relates to a process for the manufacture of acetone from isopropyl alcohol accordin to the equation:

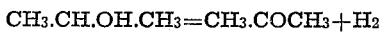
$$CH_3.CH.OH.CH_3 = CH_3.COCH_3 + H_2$$

It is known that the above reaction may be effected by passing isopropyl alcohol at elevated temperature over substances acting as catalysts. Such substances are, for instance, copper, manganese peroxide, barium peroxide, metals of the platinum group, zinc oxide, cadmium oxide, uranium oxide, blue tungsten oxide, manganese oxide, vanadium pentoxide, magnesium oxide, beryllium oxide, zirconium oxide, etc.

Experiments were carried out with the above substances as catalysts, whereby it was found that although said substances have excellent properties for promoting the above reaction, their activity decreases considerably after they have been used for some time.

I have now found that so far as the metal catalysts are concerned the above drawback may be overcome and the life of the catalysts prolonged by employing with the catalyst as a promoter a quantity of one or more of the substances hereinafter referred to.

According to my invention the process for the manufacture of acetone from isopropyl alcohol consists in effecting the reaction in the presence of a metallic catalytic mass, which is known to have a favourable catalytic effect on the reaction, with the addition of one or more of the following substances, namely zinc oxide, thorium oxide, sodium carbonate, cerium oxide, zirconium oxide, or compounds yielding such substances during the reaction.

Generally the amount of the substance which prolongs the life of the catalyst may be small, say 1 per cent by weight of the catalyst. It is possible to mix the catalytic mass according to the invention with other substances, whether or not of inert nature.

Furthermore it has been found that it is essential to carry out the reaction at temperatures below 400° C. and preferably not above 350°. Higher temperatures tend to the formation of considerable quantities of propylene and consequently will decrease the yield of acetone.

The following example serves to illustrate the process of the invention.

100 parts by weight of pumice stone, 20 parts by weight of copper oxide and 0.24 parts by weight of anhydrous sodium carbonate are intimately mixed together with a little water and dried. It is desirable but not essential to treat the mass thereafter with a suitable reducing agent, for instance hydrogen, whereby the copper oxide is reduced to copper. As the reaction yields hydrogen, this may at the same time serve to perform the reduction of the copper oxide, so that a preliminary reduction may be omitted. The mass thus obtained is introduced into a tube made of a suitable material and heated at 300° C. Isopropyl alcohol is then passed through the tube and the outflowing gases are conducted through one or more washing apparatus suitably supplied with water, which dissolves the acetone and unconverted isopropyl alcohol. The undissolved gases chiefly consist of hydrogen and small quantities of carbon monoxide and gaseous hydrocarbons, part of which may be of an unsaturated nature. The hydrogen may, if desired, after a suitable purification be used for different purposes; the acetone and isopropyl alcohol may be separated in any well known way and the latter can again be used for conversion into acetone.

Naturally the separation of the products, which are contained in the gaseous reaction mixture flowing out of the tube, may be effected in any other well-known and suitable way. Thus, for instance, the reaction mixture may be cooled, whereby the acetone and unconverted isopropyl alcohol are condensed and may be easily separated from each other.

My invention also includes every other suitable method of contacting isopropyl alcohol with the catalytic masses according to the invention.

The catalytic masses according to the invention may be regenerated after a long period of use in any well known way, for instance, by a treatment with steam and/or oxidizing agents for instance air, at elevated temperature, and contingently thereupon treating same with a reducing agent as described above.

By way of comparison the following data are quoted to show the advantage of the catalysts according to my invention.

After isopropyl alcohol had been passed for about 430 hours through a catalyst consisting of 100 parts by weight of pumice stone intimately mixed with a quantity of copper oxide corresponding to 20 parts by weight of copper oxide and prepared in the same way as described above, without addition of sodium carbonate, the catalyst was able to convert about 50 per cent of the isopropyl alcohol passed therethrough into acetone, whereas the fresh catalyst was capable of converting about 80 per cent of the isopropyl alcohol.

In contradistinction therewith the catalyst prepared with a small quantity of sodium carbonate as indicated above after being used for 455 hours under the same reaction conditions was still able to convert 77 per cent of the isopropyl alcohol, whereas its activity, when freshly prepared, was about the same as that of the catalyst containing only copper.

A catalyst prepared as described above, but with the aid of a small quantity of zinc acetate, which after reduction yields zinc oxide was after 700 hours' use still able to convert about 76 per cent of the isopropyl alcohol. Also a catalyst containing small quantities of cerium oxide after being used for 680 hours at 260° C. was still able to convert 84.5 per cent of the isopropyl alcohol.

What I claim is:—

1. A process for the manufacture of acetone from isopropyl alcohol comprising heating isopropyl alcohol in the presence of a metal catalyst known to have a favorable catalytic effect on the dehydrogenation of said alcohol to acetone and at temperatures sufficiently high to produce acetone by dehydrogenation of said alcohol in the presence of said catalyst, with the addition of a promoting substance for the catalyst effective in prolonging the active life thereof selected from a group consisting of zinc oxide, thorium oxide, sodium carbonate, cerium oxide, zirconium oxide and compounds which yield such substances during the reaction.

2. A process according to claim 1 wherein the amount of the additional substance does not substantially exceed 1 per cent by weight of the catalyst.

3. A process according to claim 1 wherein the reaction is carried out at a temperature below 400° C.

4. A process according to claim 1 in which the metal catalyst used is one consisting essentially of copper.

5. The process of dehydrogenating a secondary alcohol which comprises contacting said alcohol with a metal dehydrogenating catalyst at an elevated temperature in the presence of an inorganic oxide capable of prolonging the activity of the catalyst.

6. The process of dehydrogenating a secondary alcohol which comprises contacting said alcohol with a metal dehydrogenating catalyst at an elevated temperature in the presence of at least one promoter of the class consisting of zinc oxide, thorium oxide, sodium carbonate, cerium oxide, zirconium oxide and compounds yielding such substances during the reaction.

7. The process of dehydrogenating isopropyl alcohol which comprises contacting said isopropyl alcohol with a dehydrogenating catalyst at an elevated temperature in the presence of an inorganic oxide which prolongs the active life of the catalyst, said inorganic oxide being different in composition from the catalyst and present in an amount up to about 1% by weight of the catalyst mass.

HERMANUS FRANS JOSEPH LORANG.